United States Patent Office 3,075,982
Patented Jan. 29, 1963

3,075,982
NOVEL, WATER-SOLUBLE BENZAZIMIDE AND QUINAZOLONE SALTS AND A PROCESS FOR PRODUCING THE SAME
Ernst Tietze, Koln-Stammheim, Siegfried Petersen, Leverkusen, and Friedrich Hoffmeister, Wuppertal-Elberfeld, Germany, assignors to Farbenfabriken Bayer Aktiengesellschaft, Leverkusen, Germany, a corporation of Germany
No Drawing. Filed Sept. 27, 1960, Ser. No. 58,619
Claims priority, application Germany Oct. 3, 1959
7 Claims. (Cl. 260—256.4)

We have discovered that heterocylic compounds of the general formula

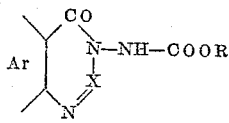

wherein Ar denotes an aromatic ring system condensed at the o-position, which may be substituted if desired, X means the groups N, CH, C-alkyl, or C-aryl, and R is the residue of an alcohol with 1–6 C-atoms, possess valuable pharmaceutical properties.

Some of these compounds, which are derivatives of benzazimide or quinazolone, respectively, have been known for some time, but their value as pharmaceutical agents has not previously been recognised.

For the practical utilisation of these substances, it is essential to obtain them in a water-soluble form. Above all, their use as narcotics depends on the condition that solutions may be prepared which can be injected.

It has now been discovered that these compounds can be readily converted into water-soluble preparations when they are reacted with approximately one equivalent of an inorganic base.

It is probable that the hydrogen atom of the hydrazine group is sufficiently acid to form salts with suitable bases.

As inorganic bases, the alkali and alkaline earths are primarily suitable. They can be employed in the form of their hydroxyl compounds or in the form of their alcoholates. In exceptional cases, it is also possible to work with the respective alkali or alkaline earth metals in an inert solvent.

In the simplest case, the compounds of the above-stated general formula can be brought into solution in water by the addition of a little more than the calculated amount of the stated bases. However, very frequently, it is possible to separate the desired salts in a solid form, and then to process them afresh to pharmaceutically applicable solutions. The separation is carried out, for instance, by salting out, by precipitation with non-polar solvents, or by evaporation of the corresponding solutions.

It was not to be foreseen that compounds of the stated type would be suitable for the salt formation. Moreover, it has been described in the literature that 3-amino-4-oxo-3,4-dihydro-(benzo-1,2,3-triazine)-N-carboxylic acid esters, on boiling with sodium hydroxide solution, are decomposed with the formation of o-azido-benzoic acid (cf. G. Heller, J. pr.(2), 116, 6 (1927).

The following examples are given for illustrating the invention.

Example 1

46.8 parts by weight of the 3-amino-benzazimide-N-carboxylic acid ethyl ester (M.P. 150–151° C. from ethyl acetate) are suspended, while finely powdered, in 80 parts by weight of water, and dissolved to give a clear solution with 100 cc. of 2 N sodium hydroxide solution. To this solution, there are added at 20° C. and with stirring 90 parts by weight of potassium carbonate. The potassium salt separates at first as an oil, but rapidly solidifies as crystals after seeding. It is quickly filtered off by suction, rinsed with some 30% potassium carbonate solution and the adhering mother liquor is removed with acetone.

The potassium salt is a white powder stable to air. It is very readily soluble in water. The pH value of the aqueous solution is 8–9. The yield of potassium salt is 50 parts by weight. The starting material of M.P. 151° C. is recovered from the aqueous solution by means of acetic acid.

Example 2

46.8 parts by weight of the 3-amino-benzazimide-N-carboxylic acid ethyl ester (M.P. 150–151° C.) are dissolved in 250 parts by weight of methanol. A solution of 4.6 parts by weight of sodium metal in 100 parts by weight of methanol is gradually added, with stirring at 18–20° C., until a sample exhibits the pH-value of 9 on test paper wetted with water. Then, 600 parts by weight of absolute ether are slowly added. On cooling in ice water, the sodium salt precipitates as crystals. The suction-filtered sodium salt is washed with a little ether and dried at 40–50° C. 45 parts by weight of sodium salt are obtained; it is very readily soluble in water, the pH value of the aqueous solution being 9; the solution is stable at 25–30° C., and the pure starting material of M.P. 150° C. can be precipitated from the solution by means of acetic acid.

Example 3

46.6 parts by weight of the 3-amino-quinazolone-N-carboxylic acid ethyl ester are dissolved at 60° C. in 150 parts by weight of dimethylformamide. 50 parts by weight of methanol are added at 50° C. to the clear solution, and then a solution of 4.6 parts by weight of sodium metal in 50 parts by weight of methanol, whereupon the sodium salt precipitates as a white powder the separation being completed by the addition of 200 parts by weight of absolute ether. After filtering off by suction, the sodium salt is washed with ether and dried at 60° C. Yield: 48 parts by weight. The salt is readily soluble in ether. The pH-value of the aqueous solution is 9–10.

Example 4

49.6 parts by weight of the 7-methyl-3-amino-benzazimide-N-carboxylic acid ethyl ester are dissolved at 50° C. in 500 parts by weight of methanol. After the addition of the equivalent amount of sodium methylate in methyl alcohol, and gradual addition of approximately the same volume of absolute ether, the sodium salt crystallises out as yellowish crystals in almost the calculated quantity. It is readily soluble in water, the aqueous solution having the pH-value of 9.

Corresponding alkali metal or alkaline earth metal salts can be prepared from the following compounds:

| | M.P. (of the starting product), ° C. |
|---|---|
| 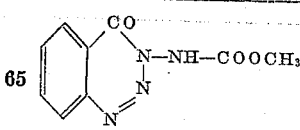 | 153–154 |
| 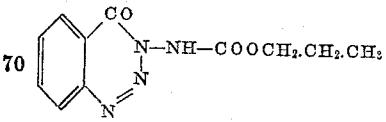 | 101–102 |

| | M.P. (of the starting product), °C. |
|---|---|
| 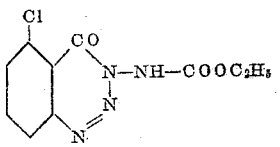 | 148-149 |
| 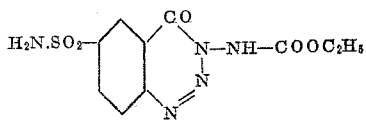 | 224-225 |
| 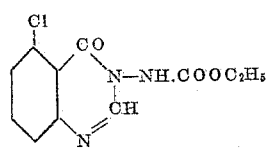 | 195-196 |
| 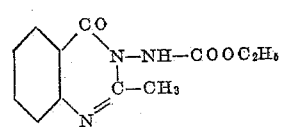 | 127-129 |
| 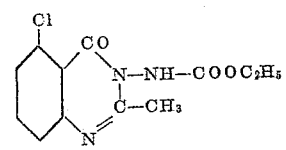 | 151-153 |
| 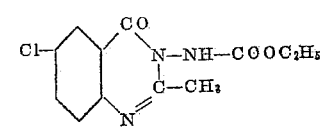 | 147-148 |
| 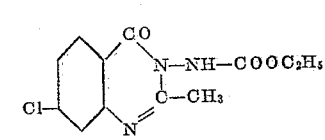 | 134 |
| 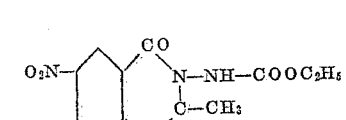 | 169-171 |
| 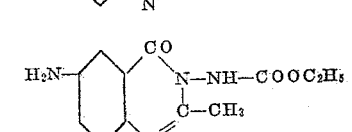 | 189-190 |
| 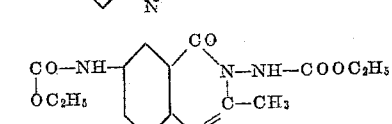 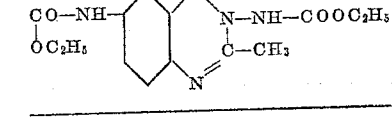 | 169 |

We claim:

1. An alkali metal salt of a heterocyclic compound of the formula:

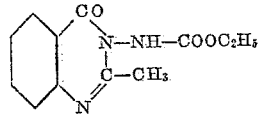

2. An alkali metal salt of a heterocyclic compound of the formula:

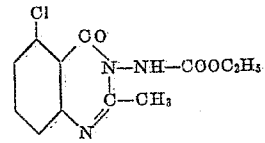

3. An alkali metal salt of a heterocyclic compound of the formula:

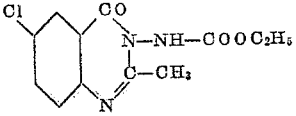

4. An alkali metal salt of a heterocyclic compound of the formula:

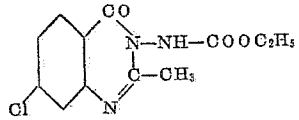

5. An alkali metal salt of a heterocyclic compound of the formula:

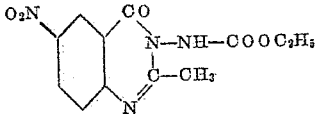

6. An alkali metal salt of a heterocyclic compound of the formula:

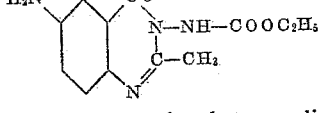

7. An alkali metal salt of a heterocyclic compound of the formula:

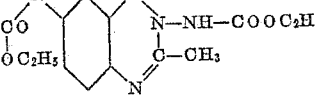

References Cited in the file of this patent

UNITED STATES PATENTS 2,651,632   Baker et al. _____ Sept. 8, 1953

OTHER REFERENCES

Heller et al.: Journ. fur Prakt. Chemie, vol. NF 116, pages 1 to 9 (1927).

Erickson et al.: "The 1,2,3- and 1,2,4-Triazines, Tetrazines and Pentazines," pages 17 and 18, 21 to 22 and 25 to 26, Interscience Publishers, Inc., New York (1956).